April 3, 1934.   R. E. OLSON ET AL   1,953,721
METHOD AND APPARATUS FOR CONTROLLING TEMPERATURES
Filed July 6, 1932
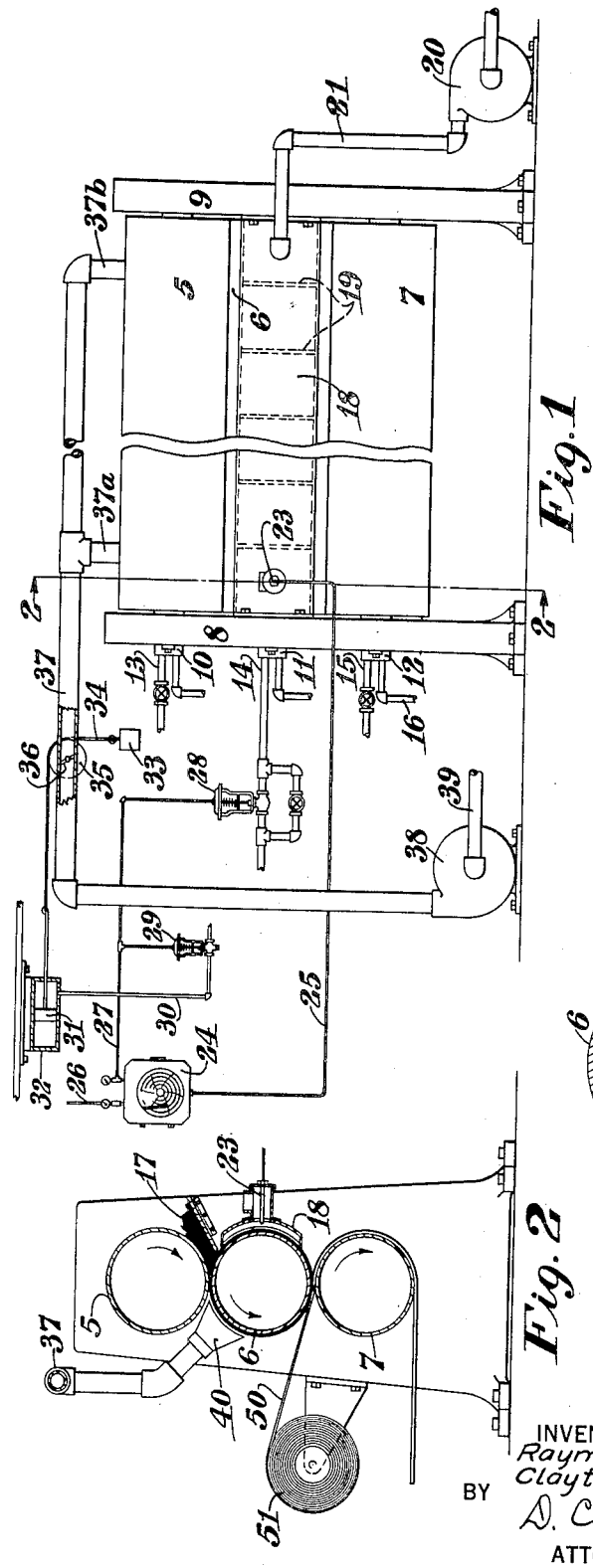

Patented Apr. 3, 1934

1,953,721

UNITED STATES PATENT OFFICE 1,953,721

METHOD AND APPARATUS FOR CONTROLLING TEMPERATURES

Raymond E. Olson and Clayton D. De Mers, Rochester, N. Y., assignors to Taylor Instrument Companies, Rochester, N. Y., a corporation of New York Application July 6, 1932, Serial No. 621,122

5 Claims. (Cl. 18—2)

This invention relates to the method of an apparatus for controlling the external surface temperature of calender or press rolls.

In the past, an attempt has been made to maintain the external surface temperature of calender rolls or press rolls at a predetermined value by circulating water at a regulated temperature within the roll, but owing to the necessary thickness of any heavy roll there has been such a pronounced temperature lag between its outer surface and the circulating water therein that such temperature controlling systems have not proved to be satisfactory.

In accordance with the present invention it is proposed to detect the temperature of the outer surface of the roll or the material thereon and to apply thereto a current of cooling fluid such as air, the amount of which is regulated in accordance with the temperature thus detected.

A further feature of the invention relates to a novel method of detecting the temperature of the outer surface of a rotating roll.

For a clearer understanding of the invention, reference is made to the drawing in which Fig. 1 is a side elevation of a calender roll machine together with mechanism, in part indicated diagrammatically, for regulating external surface temperature of a calender roll; Fig. 2 is a vertical sectional view taken substantially on line 2—2 of Fig. 1; and Fig. 3 is a detail cross sectional view of the intermediate calender roll of a calender machine and related mechanism for indicating the manner in which the temperature of the external surface of the roll is detected.

Referring especially to Figs. 1, 2 and 3, there is indicated a calender machine particularly adapted for the calendering of rubber and for applying it to a fabric. It will be understood, however, that the present method is equally applicable in controlling the temperature of and therefore the crown of rolls utilized in drawing sheet metal. In these figures the calender machine is represented as having three vertical calender rolls 5, 6 and 7 mounted to rotate in suitable bearings provided in the uprights 8 and 9. These rolls are arranged to be heated internally by circulating hot water introduced therein under the manual control of hand valves through conduits 13, 14 and 15 passing through the mill T's 10, 11 and 12. In this manner the rolls 5, 6 and 7 can be brought up to the desired temperature under manual control when the calender machine is first set into operation, for example, at the beginning of each day's work. Thereafter the friction of the rubber such as 17 (indicated in Fig. 2) as it engages the several rolls, helps to maintain a temperature very close to that normally desired, so that after a short interval of time, heating medium supplied through the conduits 13, 14 and 15 to the interior of the rolls 5, 6 and 7, may be partially or totally discontinued. Subsequently the friction of the rubber in engagement with the calender rolls will generate adequate heat so that it is usually necessary to apply a cooling medium to the external surface of the roll. In the event that the heat of friction does not raise the temperature of roll 6 to the desired amount, hot water supplied under automatic control of valve 28 is introduced through conduit 14 into this roll.

In order to determine the external surface temperature of the roll 6 or more accurately the layer of rubber with which it is completely covered during the calendering operation there is provided an air sampling or collector box 18 extending substantially the entire length of the roll and being formed as indicated in Figs. 2 and 3 to conform generally to the curvature of the roll without actually coming into contact therewith. Within the collector box there are provided a series of vertical strips such as 19 serving as baffles whereby a current of air of a uniform temperature and humidity is forced by the blower 20 through the pipe 21 and through the box 18. This air current comes in contact with the surface of the material and the roll 6 at all areas thereof defined by the strips 19 and by the margins of the box and thereafter this air, which now represents the temperature of the material on the surface of the roll, pass to the atmosphere through outlet 22 after coming into contact with a thermosensitive bulb 23. This bulb is connected by a capillary 25 to a regulating instrument 24, the structure of which is well known and need not be herein described. It is sufficient to state that as the temperature to which the bulb 23 is exposed, increases, the regulator permits the flow of pressure fluid from conduit 26 to conduit 27 and thence to actuating tops of motor valves 28 and 29 to operate them. The valve 28 on operation serves to cut off the flow of heating medium such as water or steam through the conduit 14, while the motor valve 29 cuts off fluid pressure from the conduit 30. The operation of valve 29 permits pressure fluid to flow through conduit 30 into the right-hand end of cylinder 32 to cause piston 31 to move to the left. The piston 31 has connected thereto a flexible tape 34 passing over a sheave wheel 35 and terminating at a weight 33. Thus when the piston moves to the left, it carries with it the tape 34 which rotates the sheave wheel 35 to open louver 36 in the pipe 37. Thereafter the blower 38 delivers cold air from the pipe 39 to the pipe 37 under control of louver 36. Pipe 37 has a plurality of branches preferably three or more, of which only two, 37a and 37b, are illustrated in Fig. 1. Each branch terminates in an enlarged outlet 40 whereby a large surface of the roll 6 or the material thereon, may be exposed to the cooling medium delivered through pipe 37.

When the calender machine is first set in operation, i. e., when the rolls 5, 6 and 7 are cold, the hand valves of pipes 13, 14 and 15 are opened so that steam or hot water may be introduced into these rolls to bring them quickly up to the desired temperature. When these rolls are at the desired temperature, a quantity of rubber indicated at 17, Fig. 2, is introduced between the rolls 5 and 6. These rolls calender the rubber causing it to form a thin layer on the surface of roll 6 from which it is transferred to fabric 50 as it is unwound from reel 51 while passing about the roll 7 after which it is rewound on a reel (not shown). The temperature of the rolls 5 and 7 which are not as important as the roll 6, are herein represented as being hand controlled by the hand valves in pipes 13 and 15 although automatic temperature control similar to that employed in regulating the temperature of the roll 6, may be used.

During the time when the regulating machine is in operation the blower 20 delivers conditioned air of predetermined temperature and moisture content to the air sampling or collector box 18 wherein it comes in contact with the material on the surface of the roll 6 where it assumes a temperature related to that of the material and subsequently emerges through the outlet 22 after coming in contact with the bulb 23. The thermosensitive bulb 23 in response to changing temperature conditions communicates through the capillary 25 with the operating mechanism of instrument 24. This instrument operates to control the application of fluid pressure to the actuating tops of motor valves 28 and 29. The motor valve 28 regulates the flow of heating medium through pipe 14 to the interior of roll 6, whereas the motor valve 29 controls the position of the louver 36 whereby the amount of cooling air delivered by the blower through the pipe 37 and its branches to the roll 6, is controlled.

We claim:

1. The method of regulating the temperature of the outer surface of a rotating roll which comprises determining the temperature of this surface of the roll by passing a stream of gas at a predetermined temperature over the surface of the roll, detecting the change in temperature of said gas, and applying a stream of fluid to said surface in amounts corresponding to the detecting temperature change.

2. The method of regulating the temperature of the outer surface of a rotating roll which comprises passing a current of air of uniform temperature and humidity over the surface of the roll, detecting the change in temperature of said air as the result of contact with said surface, and applying a cooling medium to said surface in amounts corresponding to the detected temperature change.

3. In a device of the class described, a rotating roll, a fluid sampling box mounted adjacent said roll, said box being provided with an inlet and an outlet but being otherwise closed except at its side which faces the roll, means for supplying a fluid of uniform temperature through said inlet, a thermosensitive element adjacent said outlet, regulating mechanism responsive to said thermosensitive element, and means controlled by said regulating mechanism for supplying a temperature regulating fluid to the outside surface of said roll.

4. In a device of the class described, a rotating roll, a fluid sampling box mounted adjacent said roll, said box being provided with an inlet and an outlet but being otherwise closed except at its side which faces the roll, means for supplying a fluid of uniform temperature through said inlet, a thermosensitive element adjacent said outlet, regulating mechanism responsive to said thermosensitive element, and means controlled by said regulating mechanism for supplying a temperature-regulating medium to said roll.

5. In a device of the class described, a rotating roll, a fluid sampling box mounted adjacent said roll, said box being of a length substantially coextensive with the length of said roll, said box being provided with an inlet at one end and an outlet at the other end but being otherwise closed except at the side thereof which faces the roll, means for supplying a fluid of uniform temperature through said inlet, a thermosensitive element adjacent said outlet, regulating mechanism responsive to said element, and means controlled by said regulating mechanism for supplying a temperature-regulating medium to said roll.

RAYMOND E. OLSON.
CLAYTON D. DE MERS.